US010182161B2

(12) United States Patent
Gonzalez Plaza et al.

(10) Patent No.: US 10,182,161 B2
(45) Date of Patent: Jan. 15, 2019

(54) MODIFYING A QUALITY OF A CONNECTION BETWEEN A TERMINAL AND AN APPLICATION SERVER (75) Inventors: Alfredo Gonzalez Plaza, Madrid (ES); Ricardo Barcena, Singapore (SG); Jose Luis Mariz Rios, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 296 days.

(21) Appl. No.: 14/397,232

(22) PCT Filed: Apr. 27, 2012

(86) PCT No.: PCT/EP2012/001820
§ 371 (c)(1),
(2), (4) Date: Oct. 27, 2014

(87) PCT Pub. No.: WO2013/159794
PCT Pub. Date: Oct. 31, 2013

(65) Prior Publication Data
US 2015/0079926 A1 Mar. 19, 2015

(51) Int. Cl.
*H04M 11/00* (2006.01)
*H04M 15/00* (2006.01)
(Continued)

(52) U.S. Cl.
CPC .... *H04M 15/8016* (2013.01); *H04L 12/1407* (2013.01); *H04L 12/1492* (2013.01);
(Continued)

(58) Field of Classification Search
CPC ............ H04L 43/0829; H04L 43/0858; H04L 43/087; H04L 43/12; H04L 43/0864; H04J 3/14
(Continued)

(56) References Cited

U.S. PATENT DOCUMENTS

2006/0089999 A1* 4/2006 Xiang .................... H04L 63/08
709/229
2010/0217821 A1* 8/2010 Grayson ............. H04L 41/5019
709/206
2013/0016677 A1* 1/2013 Kunz .................... H04W 76/12
370/329

FOREIGN PATENT DOCUMENTS

EP    2 154 647 A1    2/2010
EP    2154647    *    2/2010
(Continued)

OTHER PUBLICATIONS

3GPP TS 32.299 V11.3.0 (Mar. 2012) 3rd Generation Partnership Project; Technical Specification Group Services and System Aspects; Telecommunication management; Charging management; Diameter charging applications (Release 11); 650 Route des Lucioles—Sophia Antipolis, Valbonne, France; 150 pages.
(Continued)

*Primary Examiner* — Erika A Washington
(74) *Attorney, Agent, or Firm* — Sage Patent Group (57) ABSTRACT

A method for modifying a quality of a connection between a terminal and an application server of a network is described. The application server provides a service to the terminal via the connection. The method includes sending, by the terminal, a quality modification request for a desired modification of a quality of the provided service, and determining, by the network, a condition of the connection to be modified based on the quality modification request. The determined condition to be modified is associated with the quality of the provided service. The method includes determining, by the network, a charging price for the determined condition of the connection to be modified, modifying, by the network, a condition of the connection, and charging, by the network, for modifying the condition of the connection.

17 Claims, 5 Drawing Sheets

(51) Int. Cl.
*H04W 4/24* (2018.01)
*H04L 12/24* (2006.01)
*H04L 12/14* (2006.01)

(52) U.S. Cl.
CPC .......... *H04L 41/18* (2013.01); *H04L 41/5029* (2013.01); *H04M 15/66* (2013.01); *H04W 4/24* (2013.01)

(58) Field of Classification Search
USPC .................. 455/406; 370/252; 709/206, 228
See application file for complete search history.

(56) References Cited

FOREIGN PATENT DOCUMENTS

| | | |
|---|---|---|
| GB | 2 389 745 A | 12/2003 |
| WO | WO 2008/119930 A1 | 10/2008 |

OTHER PUBLICATIONS

3GPP TS 23.203 V11.5.0 (Mar. 2012) $3^{rd}$ Generation Partnership Project; Technical Specification Group Services and System Aspects; Policy and charging control architecture (Release 11); 650 Route des Lucioles—Sophia Antipolis, Valbonne, France; 175 pages.
International Search Report and the Written Opinion of the International Searching Authority, in corresponding PCT Application No. PCT/EP2012/001820 dated May 7, 2012 (10 pages).

* cited by examiner

MODIFYING A QUALITY OF A CONNECTION BETWEEN A TERMINAL AND AN APPLICATION SERVER

CROSS REFERENCE TO RELATED APPLICATION

This application is a 35 U.S.C. § 371 national stage application of PCT International Application No. PCT/EP2012/001820, filed on 27 Apr. 2012, the disclosure and content of which is incorporated by reference herein in its entirety. The above-referenced PCT International Application was published in the English language as International Publication No. WO 2013/159794 A1 on 31 Oct. 2013.

TECHNICAL FIELD

The invention relates to telecommunications and in particular to methods, a condition and charging node, a charging node, and a network gateway for modifying a quality of connection between a terminal and an application server of a network, and a computer program.

BACKGROUND

A nowadays available communication network is continuously involving and offers, for example, mobile broadband packages with unlimited data rates and over the top services in the area of consumer communication and digital life service, for example social media networking like Facebook or video conferencing. This trend comes along with an evolution of terminal related hardware, for example the development of smartphones.

A user of such a terminal, educated by the rapid evolution of the network and the terminal related hardware, expects a high Quality of Service (QoS) experience when being provided with a service at a reasonable charging price.

However, hardware constraints and/or software constraints both of the network and the terminal may decrease the QoS experienced by the user of the terminal. For example, such a hardware constraint may be posed by the infrastructure of the network and/or a dysfunction of the terminal. A software constraint may relate to an unbalanced capacity and resources utilization by the network when an extremely high number of terminals is connected to the network.

Therefore, the high expectations of a user of a terminal with regard to QoS may be failed, affecting tenure and loyalty concepts offered by a service provider and/or an operator of the network.

SUMMARY

It is an object of the invention to provide measures enabling a high quality of service experience of a user of a terminal in association with a service provision of a service by an application server of a network.

The object defined above is solved by methods, a condition and charging node, and a charging node for modifying a quality of a connection between a terminal and an application server of a network, and a computer program according to the independent claims.

According to an exemplary aspect of the invention, a method for modifying a quality of a connection between a terminal and an application server of a network is provided. The application server provides a service to the terminal via the connection. The method comprises sending, by the terminal, a quality modification request for a desired modification of a quality of the provided service, and determining, by the network, a condition of the connection to be modified based on the quality modification request. The determined condition to be modified is associated with the quality of the provided service. The method comprises determining, by the network, a charging price for the determined condition of the connection to be modified, modifying, by the network, a condition of the connection, and charging, by the network, for modifying the condition of the connection.

According to another exemplary aspect of the invention, a method for modifying a quality of a connection between a terminal and an application server of a network is provided. The application server provides a service to the terminal via the connection. The method is executed by a condition and charging node of the network. The method comprises determining a condition of the connection to be modified based on a quality modification request of the terminal for a desired modification of a quality of the provided service. The determined condition to be modified is associated with the quality of the provided service. The method comprises initiating to determine, by the network, a charging price for the determined condition of the connection to be modified, initiating to modify, by the network, a condition of the connection, and initiating to charge, by the network, for modifying the condition of the connection.

According to another exemplary aspect of the invention, a method for modifying a quality of a connection between a terminal and an application server of a network is provided. The application server provides a service to the terminal via the connection. The method is executed by a charging node of the network. The method comprises determining a charging price for a network determined condition of the connection to be modified based on a quality modification request of the terminal for a desired modification of a quality of the provided service. The determined condition to be modified is associated with the quality of the provided service. The method comprises charging for modifying a condition of the connection in association with modifying, by the network, the condition of the connection.

According to another exemplary aspect of the invention, a condition and charging node for modifying a quality of a connection between a terminal and an application server of a network is provided. The application server provides a service to the terminal via the connection. The condition and charging node is part of the network. The condition and charging node comprises a determination unit adapted to determine a condition of the connection to be modified based on a quality modification request of the terminal for a desired modification of a quality of the provided service. The determined condition to be modified is associated with the quality of the provided service. The condition and charging node comprises an initiating unit adapted to initiate determining, by the network, a charging price for the determined condition of the connection to be modified. The initiating unit is adapted to initiate modifying, by the network, a condition of the connection and is adapted to initiate charging, by the network, for modifying the condition of the connection.

Within the context of the present application, the term "condition of a connection" may particularly denote one or more characteristics of a bearer used for the connection. For example, a condition of the connection may relate to a rule or policy defining one or more characteristics of the bearer.

The term "modifying a condition" may particularly denote adapting an existing condition or generating a new condition. In particular, the modified condition and the existing condition prior to its modification may be identical or may be different from one another.

According to another exemplary aspect of the invention, a charging node for modifying a quality of a connection between a terminal and an application server of a network is provided. The application server provides a service to the terminal via the connection. The charging node is part of the network. The charging node comprises a determination unit adapted to determine a charging price for a network determined condition of the connection to be modified based on a quality modification request of the terminal for a desired modification of a quality of the provided service. The determined condition to be modified is associated with the quality of the provided service. The charging node comprises a charging unit adapted to charge for modifying a condition of the connection in association with modifying, by the network, the condition of the connection.

According to another exemplary aspect of the invention, a network gateway for modifying a quality of the connection between a terminal and an application server of a network is provided. The application server provides a service to the terminal via the connection. The network gateway is part of the network. The network gateway comprises a determination unit adapted to determine information to be sent for the network determining a condition of the connection to be modified based on a quality modification request of the terminal for a desired modification of a quality of the provided service, for the network determining a charging price for the determined condition of the connection to be modified, for the network modifying a condition of the connection and for the network charging for modifying the condition of the connection. The determined condition to be modified is associated with the quality of the provided service.

According to another exemplary aspect of the invention, a computer program is provided. The computer program, when being executed by a processor, is adapted to carry out or control a method for modifying a quality of a connection between a terminal and an application server of a network as described above.

Further exemplary embodiments of the invention are defined in the dependent claims.

According to the exemplary aspects, a terminal of a communication network, for example a mobile network or a wireline based network, may initiate a management of a modification of a quality of a connection between the terminal and an application server of the network by sending a respective quality modification request for a desired modification of a quality of service to be provided by the application server using the established connection. Thereupon, the network may determine a potential condition of the connection to be modified and a potential charging price for the determined condition of the connection to be modified based on the quality modification request from the terminal and may later on modify a condition of the connection and charge for the modified condition of the connection.

Therefore a dynamic connection quality management associated with real-time pricing for the modified connection condition on a per terminal basis and a per demand basis may be enabled. Thus, the quality management may be personalized for the terminal and may be dependent on the context of the terminal in the mobile network such that an overall experience of a user of the terminal associated with the quality of the connection between the terminal and the application server may be high. In particular, user experience limitations of a network triggered quality management, for example a quality management based on the network pushing an offer for a modification of the service provision depending on a day time or a location of the terminal in the network, may be omitted.

From a perspective of a user of the terminal, representing a consumer of the provided service, the ability to evaluate a current quality of the provided service and to initiate or order a modification of the condition of the connection underlying the service provision may enable the user of the terminal to take part in a rapid evolution of offered features of the network and of terminal related hardware. In particular, the service provision experienced by the user of the terminal may follow every day's dynamics and may be therefore high.

From a perspective of the network or a service provider and/or an operator of the network, a utilization of network resources may be adapted on a basis of a demand or need of the terminal, therefore improving a capacity and resources utilization by the network and improving a customer quality management by the service provided and/or the operator of the network. For example, tenure and loyalty concepts of the service provider and/or the network operator may be adapted to a frequency of the terminal requesting a modification of a particular offered service. The inventive methods may be beneficially used as premium feature of tenure and loyalty concepts or programs of Small and Medium Enterprises (SMU) with Cooperate Accounts or of Mobile Virtual Network Operators (MVNOs) and for Location Based Services (LBS), for example location based advertisements. Further, Customer Service Providers (CSP) may be enabled to collect data per specific terminal device for improving a service provision in a multi subscriber identity module environment and for multi-terminal Mobile Broadband (MMB) accounts.

BRIEF DESCRIPTION OF THE DRAWINGS

Embodiments of the invention will be described in more detail hereinafter with reference to examples but to which the scope of the invention is not limited.

DETAILED DESCRIPTION

The illustration in the drawing is schematic. In different drawings, similar or identical elements or steps are provided with the same reference signs or with reference signs which are different from one another within the first digit.

In the following, further exemplary embodiments of the method executed by the terminal and the network according to the exemplary aspect of the invention will be explained. However, these embodiments also apply to the other methods, the condition and charging node, the charging node, the network gateway and the computer program according to the exemplary aspects of the invention.

In particular, the steps of modifying a condition and charging for the modified condition may be executed in an arbitrary sequence or may be executed simultaneously.

In particular, a communication between the terminal and the application server may be based on a Hypertext Transfer Protocol (HTTP) or any other suitable communications protocol.

The quality modification request may be configured as a tentative quality modification request for a desired modification of the quality of the provided service, wherein the method may further comprise sending, by the condition and charging node of the network, the determined condition and the determined charging price to the terminal together with omitting to initiate the step of modifying a condition and/or omitting to initiate the step of charging, and sending, by the terminal, an acceptance indication indicating an acceptance of the determined condition and the determined charging price, wherein the step of modifying a condition and the step of charging may be executed based on the acceptance indication. Accordingly, the modification of the quality of the service provision to the terminal may be based on firstly, the terminal tentatively asking for a tentative offer, i.e. a non binding offer, of a modified service provision and the terminal deciding on the provided offer comprising information about the particular condition of the connection to be modified and the associated charging price. Therefore the user of the terminal may be informed about potential modifications of the service provision together with its pricing and may be therefore in control of the pricing, rendering the modified service provision transparent for the user. Accordingly, the user experience associated with the modified service provision may be high. Further, the network may learn from a user behavior associated with the offered modified service provision and pricing and may adapt the service provision based on collected data of the user behavior, therefore further improving the customer quality management of the service provider and/or the network operator.

The method may further comprise sending, by the application server, a tentative modification request for a modification of a condition of the connection based on the received quality modification request. In particular, the application server providing the service to the terminal may send the tentative modification request to another application server of a network which may forward the same tentative modification request or send another tentative modification request for the network determining the condition to be modified and the charging price. Therefore communication of the terminal with further network entities in association with the method may be avoided, and controlling of the terminal communication in the network may be facilitated.

The tentative modification request may comprise an indicator for a tentative charging event, particularly an Attribute Value Parameter (AVP) of a Credit Control Request (CCR) Command. The term "event" may particularly denote the modification of the quality of the connection. For example, the used AVP may be similarly defined to an AVP sent by a Traffic Detection Function (TDF) or a Policy and Charging Rules Function (PCRF) of a Policy Charging Control (PCC), and the tentative charging event may be indicated by a new value of the AVP. Accordingly, similar procedures for an immediate charging with a decentralized unit determination and centralized rating according to Third Generation Partnership Project (3GPP) Technical Specification (TS) 32.299 v11.3.0 may be employed, thereby facilitating the implementation of the method in already existing communication network architectures particularly defined in accordance with 3GPP TS 23.203 v11.5.0.

The method may further comprise receiving, by the application server, the determined condition and the determined charging price particularly in one message or in separate messages, converting, by the application server, the determined condition into quality information, and sending, by the application server, the quality information and the charging price to the terminal particularly in one message or in separate messages. In particular, the application server may receive the determined condition and the determined charging price directly from the condition and charging node or via a further application server, for example the above mentioned further application server. In particular, the application server may send the quality information and the charging price directly to the terminal or via a further application server, for example one of the above mentioned further application servers. Therefore, the terminal may be enabled to interpret the impact of the determined condition to be modified and the charging price, in order to decide in a properly informed way whether to accept the offered modification of the service provision and the offered pricing thereof.

In particular, the determined condition to be modified and the determined charging price may be indicated by Attribute Value Parameters of a Credit Control Answer (CCA) Command sent from the condition and charging node to the application server. Utilization of Diamond pair commands for transferring the requested information may facilitate a definition of a communication protocol used between the respective network nodes.

The method may further comprise sending, by the application server, a modification request for a modification of the condition of the connection based on the received acceptance indication, in order to indicate to the network the definite order of the terminal for the modification of the condition of the connection or to indicate a confirmation of the terminal for the previously sent modification request and/or the determined condition to be modified together with the determined charging price.

The modification request may comprise an indicator for a charging event, particularly an Attribute Value Parameter (AVP) of a Credit Control Request (CCR) Command. For example, the used AVP may be similarly defined to an AVP used by a Traffic Detection Function (TDF) or a Policy and Charging Rules Function (PCRF) of a Policy Charging Control (PCC), and the charging event may be indicated by a new value of the AVP. The above described technical effect of the tentative modification request may similarly apply to the modification request.

The method may further comprise sending, by a condition and charging node of the network, a tentative determination request to a charging node of the network for tentatively determining the charging price, and receiving the determined charging price from the charging node. In particular, the tentative determination request may further comprise a number of units in a virtual currency being determined by the condition and charging node together with the determined condition to be modified. The charging node may determine the charging price based on the received number of units, and may assign the determined number of units to a monetary amount in a real currency being the charging price for the determined condition to be modified. Therefore the condition and charging node may be free of a charging functionality and its storage and processing resources may be low.

The step of determining the charging price may be executed by the charging node of the network together with omitting to initiate the step of charging for modifying the condition such that the user of the terminal may be first informed about a potential condition of the connection to be modified and its associated determined charging price before the actual charging may be executed.

The tentative determination request may comprise an indicator for a charging event, particularly an Attribute Value Parameter (AVP) of a Credit Control Request (CCR) Command whose value may be newly defined. Thus, as explained above, procedures similarly to TS 32.299 v11.3.0 may be employed for transferring information during the method, thereby facilitating the implementation of the method in existing network architectures. The number of units may be indicated by a further AVP of the sent CCR Command.

In particular, the determined charging price may be indicated by an Attribute Value Parameter of a Credit Control Answer (CCA) Command sent from the charging node to the condition and charging node. As explained above, the utilization of Diamond pair commands for transferring the requested information may facilitate a definition of a communication protocol used between the respective network nodes.

The step of modifying a condition may be executed by a condition handling node of the network in response to receiving instruction information to modify a condition of the connection from a condition and charging node of the network. The instruction information may be included in a command message sent between the condition and charging node and the charging node. For example, the command message may be a Re-Authorization Request (RAR) type message. Therefore processor capacities of the condition and charging node may be kept low, and an existing separation between the condition and charging node and the condition handling node of available communication architectures may be employed.

The step of modifying may be executed based on the determined condition of the connection to be modified. In particular, the step of charging may be executed based on the determined charging price. Therefore the network may modify the condition of the network and may charge for the modified condition in accordance with the quality information and charging price once offered to the terminal. Therefore the modification and the charging may be immediately executed without time delay. Further, a decrease in a user experience of the user of the terminal associated with a differently modified condition of the connection and/or a different charging price in comparison to the quality information and the charging price accepted by the terminal may be prevented.

The method may further comprise determining, by the network a further condition to be modified based on the modification request, and determining, by the network, a further charging price associated with the condition to be modified based on the modification request, wherein the step of modifying a condition may be executed based on the determined condition or the determined further condition and the step of charging for modifying the condition may be executed based on the determined charging price. Therefore the network may be enabled to be accurately informed about an actual pricing for providing a modified quality of the connection with the terminal based on the condition or the further condition, while the user or subscriber of the terminal may be charged according to the once offered charging price. In particular, knowledge about the determined further charging price and the further condition may be used by the service provider or the network operator for recording purposes with respect to account consolidation. Further, the user of the terminal may not be affected by a change in the charging price between the accepted charging price and the further charging price. Conventional procedures executed by the condition and charging node, the condition handling node, and the charging node with respect to modifying the condition based on the determined further condition may be used, therefore facilitating the implementation of the method in the already existing communication network architecture. Therefore, a user-friendly compromise between a real-time pricing together with a dynamic modification of a connection quality and a high user experience resulting from a service provision based on the accepted quality information and the accepted charging price may be enabled.

In particular, a determination request for determining the further charging price associated with the determined further condition may be sent from the condition and charging node to the charging node, and may comprise an indicator for a charging event, particularly an Attribute Value Parameter (AVP) of a Credit Control Request (CCR) Command whose value may be newly defined. The determination request for determining the further charging price may comprise an indication that the charging price offered to the terminal may be used for the step of charging. Alternatively, the charging node may be preconfigured to base the step of charging on the determined charging price. In particular, since the step of charging may be executed in response to receiving the determination request, the determination request may be regarded as a request for a real charging event.

In particular, a request for executing the charging may be sent from the condition and handling node to the charging node particularly if the method may not comprise the step of determining the further condition and the step of determining the further charging price. In particular, the method may further comprise comparing, by the condition and charging node, a time value of a time interval between the steps of sending the determined condition to be modified and the determined charging price and the step of receiving the modification request with a threshold value, wherein the step of determining the further condition and the step of determining the further charging price may be executed based on a result of the step of comparing. In particular, the network may determine the further condition and the further charging price, if the determined time value of the time interval may be above and optionally equal to the threshold value, wherein the network may omit determining the further condition and the further charging price, if the time value of the time interval may be below and optionally equal to the threshold value. Therefore, the method may comprise a measure for reducing method steps of the method, such that an unnecessary utilization of processing resources of the network concerning a re-determination of already known information may be avoided.

Alternatively, the method may particularly comprise the step of determining the further condition and the step of determining the further charging price irrespectively of the result of the step of comparing. Therefore the network may be accurately informed about the actual pricing associated with the step of modifying the condition without decreasing the user experience associated with the user being charged with the determined further charging price.

In particular, the method may comprise sending to the terminal a time interval value together with the determined condition and the determined charging price in order to indicate to the user of the terminal a time period during which the offered quality information and the offered charging price may be valid to be accepted. The time interval value may be sent together with the determined condition and the determined charging price from the condition and charging node to the application server and/or together with the quality information and the charging price sent from the application server to the terminal.

At least one of the step of determining the, particularly further, condition of the network to be modified and the step of determining the, particularly further, charging price for the condition to be modified may be based on at least one information of the group of subscriber information of the subscriber associated with the terminal, a location of the terminal, a day time, and a network resources utilization of the network. Additionally or alternatively, the step of determining the, particularly further, condition of the network to be modified and the step of determining the, particularly further, charging price for the condition to be modified may be based on statistical or historical information of a behavior of the terminal or one or more other terminals in the network with respect to the modification of the service provision. In particular, the information may be sent by the network gateway via a single interface to the condition and charging node and the charging node, respectively. Altogether, the accuracy of the determined, particularly further, condition and the determined, particularly further, charging price may be increased.

In particular, the step of charging may comprise deducting the charging price at least partially from an account of the subscriber of the terminal and/or at least partially from an account of the subscriber of the terminal associated with a tenure and loyalty program. In particular, the step of charging may be executed per payment interval of the provided service, for example monthly, or per request or usage of the modified service provision.

Next, further exemplary embodiments of the condition and charging node will be explained. However, these embodiments also apply to the methods, the charging node and the network gateway.

In particular, the condition and charging node may be adapted to, particularly automatically, execute one or more steps of the above described methods. In particular, the condition and charging node may be adapted as a Policy and Charging Rules Function (PCRF) of a core network of the network.

In particular, the condition handling function interworking with the condition and charging node may be configured as a Policy and Charging Enforcement Function (PCEF), and may be co-located with a network gateway. For example, the network gateway may be configured as a General Packet Radio Service (GPRS) Support Node (GGSN) in a GPRS based communication network architecture and as a Packet Data Network (PDN) Gateway (PDG) in a Wireless Local Area Network (WLAN).

Next, further exemplary embodiments of the charging node will be explained. However, these embodiments also apply to the methods, the condition and charging node, the network gateway and the computer program.

In particular, the charging node may be adapted to, particularly automatically, execute one or more steps of the above described methods. In particular, the charging node may be configured as an Online Charging Function (OCF) of an Online Charging System (OCS) connected to a PCRF via a Ro interface. The Ro interface between the PCRF and the OCF may be accordingly modified to enable the above described communication.

Next, further exemplary embodiments of the network gateway will be explained. However, these embodiments also apply to the methods, the condition and charging node, the charging node and the computer program.

In particular, a network gateway may be adapted to, particularly automatically, execute one or more steps of the above described method. The network gateway may form part of a Policy and Charging Control (PCC), and/or may be connected to the PCRF via the above mentioned single interface. The interface may be adapted as a new kind of interface or as an Ud interface, and the network gateway may host a User Profile Repository (UPR). Additionally or alternatively, the network gateway may comprise at least one functionality of a Bearer Binding and Event Reporting Function (BBERF), the TDF or a Subscription Profile Repository (SPR). Alternatively or additionally, the network gateway may interconnect the condition and charging node and the charging node, respectively and at least one of the UPR, BBERF, TDF and SPR. The network gateway may thus act as a data access gateway, particularly a data virtualization and federation gateway, adapted to gather all information needed by decision makers, particularly the condition and charging node and/or the charging node, and adapted to present the information to the decision makers as if the information may come from one single database.

Figure 1:
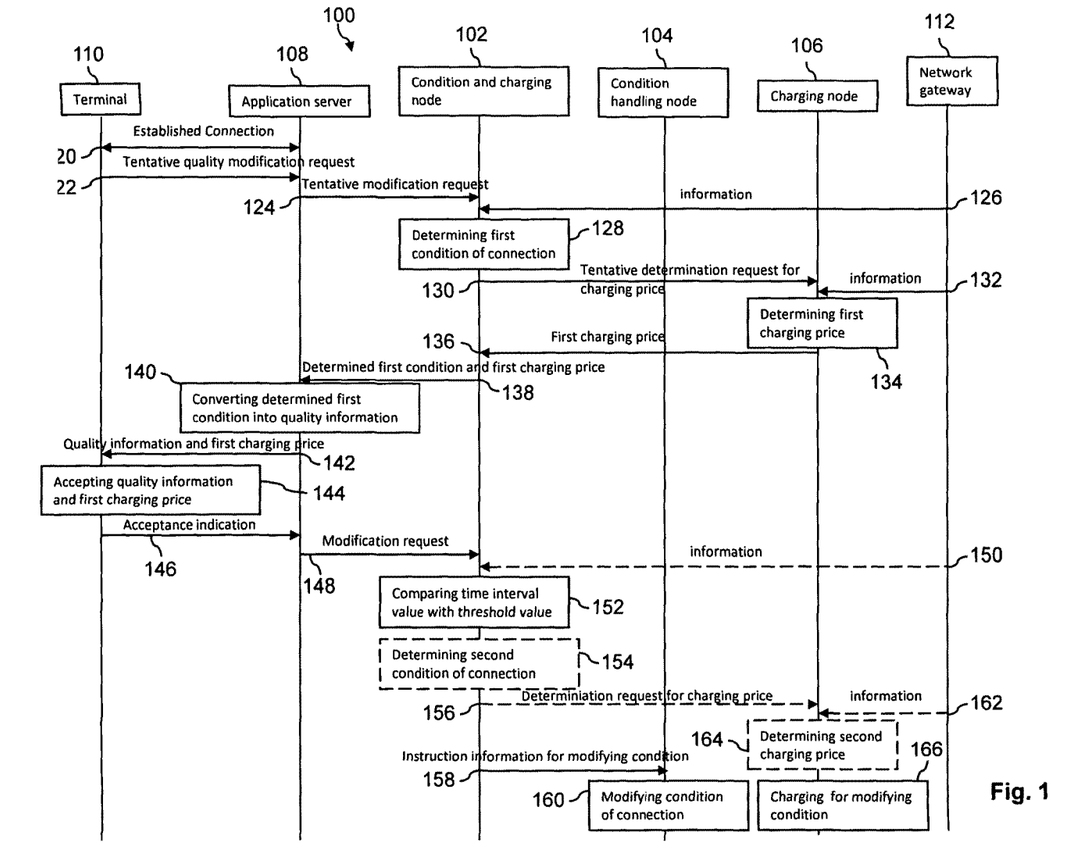
FIG. 1 is a flow diagram illustrating a method for modifying a quality of a connection between a terminal and an application server of a network according to a first exemplary embodiment.

Referring to FIG. 1, a method for modifying a quality of a connection between a terminal and an application server of a network according to a first exemplary embodiment will be explained. The network 100 comprises a condition and charging node 102, for example a PCRF, a condition handling node 104, for example a PCEF, and a charging node 106, for example a OCF. The network 100 further comprises an application server 108 adapted to provide a service to a terminal 110 residing in the network 100 via an established connection between the application server 108 and the terminal 110. The provided service may be a social media networking application, for example Facebook, or a video conference. A network gateway 112 of the network 100 is communicatively coupled to the condition and charging node 102 and the charging node 106 via a common interface, respectively. The interface may correspond to an Ud interface used between the UPR and the PCRF 102. Charging in the network 100 is event based and decentralized.

In a first step 120 of the method, a connection between the terminal 110 and the application server 108 is established and a respective session is on-going. In a next step 122, the terminal 110 sends a tentative quality modification request for a desired modification of the quality of the provided service to the application server 108. The application server 108 sends in a step 124 a tentative modification request for a modification of a condition of the connection to the condition and charging node 102 based on the received tentative quality modification request. The tentative modification request may comprise an indicator for a tentative charging event to indicate that this modification request is tentative and must be handled differently compared to a non-tentative or "normal" modification request. The tentative modification request may be a new type of message or an already known or implemented message with a specific indicator. In a next step 126, the network gateway 112 sends subscriber information indicating a subscriber associated with the terminal 110 and information about a current location of the terminal 110 in the network 100 to the condition and charging node 102. In this embodiment, the network 100 and the terminal 110 assume the subscriber of the terminal 110 coinciding with a user of the terminal 110. In a next step 128, the condition and charging node 102 determines a first condition of the connection to be modified based on the indicator of the tentative modification request received in the step 124 and the information received in the step 126. For example, the condition and charging node 102 determines that a downlink filter used by the application server 108 for filtering data in a downlink transmission direction during the connection has to be modified. No modifying of a condition will be initiated by the condition and charging node 102 because of the tentative type of the modification request received in the step 124.

Next, in a step 130, the condition and charging node 102 sends a tentative determination request to the charging node 106 for tentatively determining a charging price associated with the determined first condition of the connection to be modified. The tentative determination request may comprise a similar indicator for a tentative charging event which has been included in the tentative modification request to indicate to the charging node 106 that this event has not to start a charging, but is just for determining a charging price. The request may be a not known, i.e. a complete new, message type or may comprise a new indicator which may indicate the tentative type of the determination request message. In a step 132, the network gateway 112 sends the subscriber information and the information about the location of the terminal 110 in the network 100 to the charging node 106. In a next step 134, the charging node 106 determines the charging price associated with the determined first condition of the connection to be modified based on the indicator of the tentative determination request received in the step 130 and the information received in the step 132, and sends in a step 136 the determined charging price to the condition and charging node 102. No charging will be initiated by the charging node 106 because of the tentative type of the determination request received in the step 130.

In a step 138, the condition and charging node 102 sends the determined first condition to be modified and the determined charging price to the application server 108 in response to a receipt of the charging price in the step 136. In a next step 140, the application server 108 converts the determined first condition to be modified into quality information to be understood by the terminal 110 and by the user of the terminal 110. For example, the application server 108 converts a downlink filter specification of the downlink filter to be modified into a downlink data rate of a data transmission associated with the connection. Another example of the step 140 of converting is a translation of the condition to be modified and the charging price into any kind of information understandable for a user of the terminal 110. For example, it is possible just to indicate to the user a "high speed cannel", a "medium speed channel" or a "low speed channel" for different prices to make the change of the quality of the provided service clear for a user who might not be an expert in communication technology. There may be also other descriptions possible for a user of a terminal 110, for example "gaming speed channel" or "massive download channel", indicating use-cases for services. Thereupon, the application server 108 sends in a step 142 the quality information and the determined charging price to the terminal 110 which, in turn, accepts in a next step 144 the received quality information and the received first charging price for a modification of the service provision. To this end, the user of the terminal 110 presses a hardware button on the terminal 110 for indicating his acceptance to the offered quality information and the associated charging price presented in a display of the terminal 110.

In a next step 146, the terminal 110 sends an acceptance indication to the application server 108 in response to the above described user input. The acceptance indication indicates an acceptance of the terminal 110 for the determined quality information and thus the determined first condition to be modified and the determined charging price. In a next step 148, the application server 108 sends a modification request to the condition and charging node 102 for a modification of the first condition of the connection in response to the received acceptance indication. The modification request comprises an indicator for a real charging event. Thereupon, the network gateway 112 sends in a step 150 the subscriber information and the information about the location of the terminal 110 to the condition and charging node 102. Next, in a step 152, the condition and charging node 102 compares a time value of a time interval between the sending of the determined first condition and the determined charging price in the step 138 and the receipt of the modification request in the step 148 with a predetermined threshold value, in order to determine whether a second condition of the connection to be modified and a second charging price has to be determined. The time value is calculated by the condition and charging node 102 using time stamps associated with the execution of the steps 138, 148 by the condition and charging node 102. Assuming the determined time value to exceed the threshold value, the condition and charging node 102 determines in a step 154 a second condition of the connection to be modified based on the modification request and the information received in the step 150. For example, the determined second condition of the connection to be modified is a frequency spectrum to be used for the established connection and being broader by about 50 MHz than the currently used frequency spectrum.

Accordingly, in a step 156, the condition and charging node 102 sends a determination request for a charging price associated with the determined second condition to be modified to the charging node 106. The determination request comprises an indicator for a charging event. In a step 158, the condition and charging node 102 sends instruction information to the condition handling node 104 to modify a condition of the established connection based on the first condition, namely the downlink filter change. Next, in a step 160, the condition handling node 104 modifies the condition of the connection by adapting the downlink filter of the application service 108 based on the determined first condition. In a step 162, the network gateway 102 sends again the subscriber information and the information about the location of the terminal 110 to the charging node 106 which, in turn, determines in a step 164 a second charging price based on the determination request received in the step 156 and the information received in the step 162. The determined second charging price is slightly higher than the determined first charging price. In a step 166, the charging node 106 charges the subscriber of the terminal 110 for the modified condition of the connection by deducting the first charging price from an account of the subscriber. The second condition and the second charging price has been determined in the steps 154, 164 for recording consolidation purposes by the network 100.

It may be possible that the time interval value may have also been reported to the terminal 110 in the step 142 to indicate to a user of the terminal 110 that accepting a specific condition and charging price may be dependent on the time between the offer received in the step 142 and accepting the offer in the step 144. The user must be aware of a different condition and price, if the user waits too long with accepting the offer in the step 144.

The determined first and second conditions may be identical to one another and/or the determined first and second charging prices may be identical to one another.

Assuming the comparison step 152 to result in the time value exceeding the threshold value, the step 154, 156 and 164 may be executed for recording purposes, and the step 160 of modifying the condition may be executed based on the determined second condition, namely the frequency spectrum, while the step 166 of charging may be executed based on the determined first charging price.

Further, assuming the comparison step 152 to result in a time value being less than or equal to the threshold value, the steps 154, 156 and 164 may be omitted. Alternatively, the steps 154, 156 and 164 may be executed for recording purposes. The step 160 may be executed based on the determined first condition or the second condition, if determined, and the step 166 may be executed based on the determined first charging price.

The steps 126, 132, 150, 162 may be executed at different times with respect to the message flow in FIG. 1. For example, the steps 126 and/or 132 may be also executed immediately during the connection setup of the connection between the terminal 110 and the application server 108. Further, the network gateway 112 may send in the step 126 the information to the charging node 106, which, upon receipt of the information, extracts the information and relays the information to the condition and charging node 102. Hence, the step 132 may be omitted. The latter may also apply for the sent messages in the steps 150, 162. Further, assuming the comparison step 152 to result in the time value being less than or equal to the threshold value, the steps 150, 162 may be omitted. The network gateway 112 may also send the information in the steps 126, 132, 150, 158 upon receipt of a request from the respective recipient of the sent information.

Figure 2:
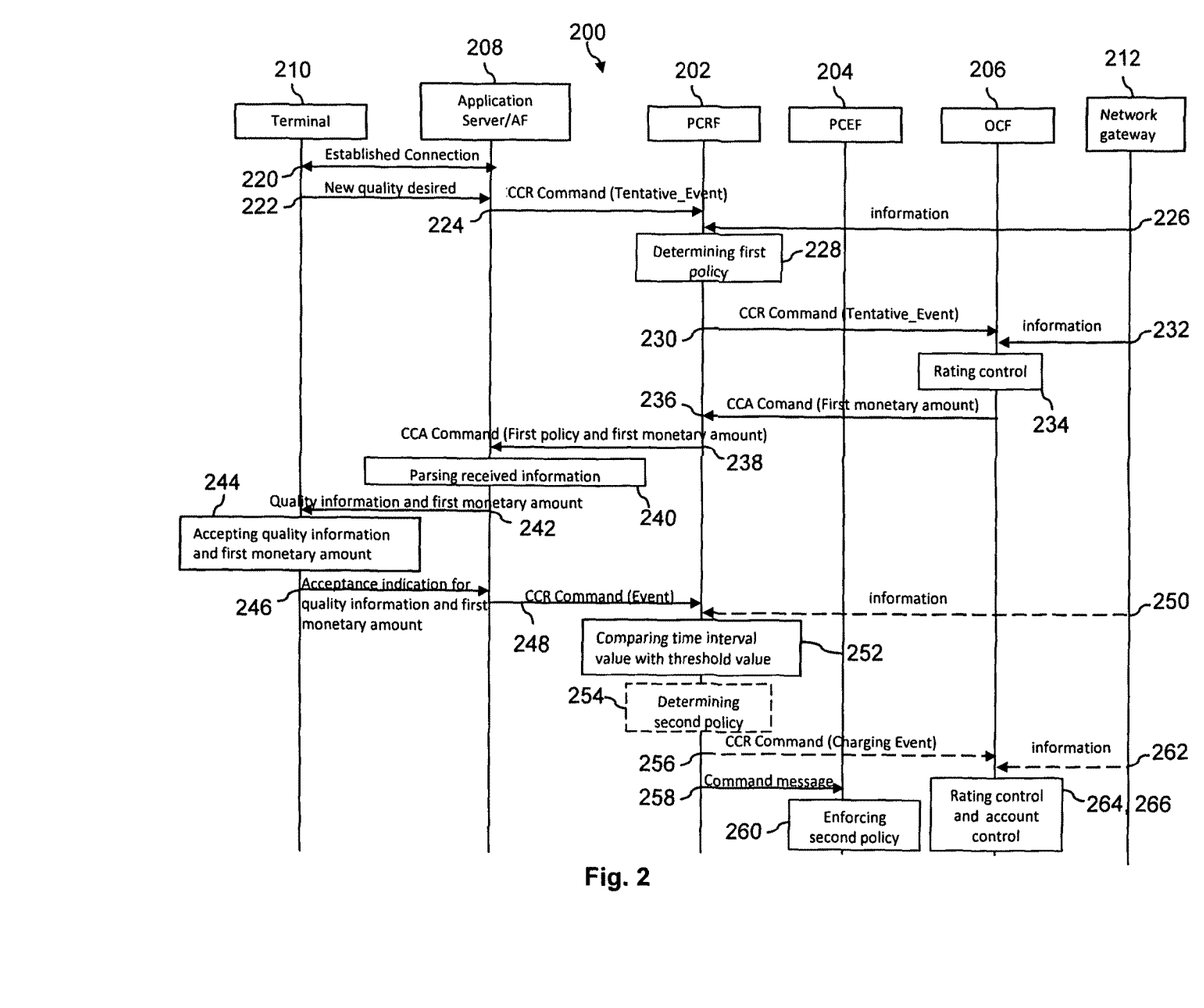
FIG. 2 is a flow diagram illustrating a method for modifying a quality of a connection between a terminal and an application server of a network according to a second exemplary embodiment.

Referring to FIG. 2, a method for modifying a quality of a connection between a terminal and an application server of a network according to a second exemplary embodiment will be explained. The network 200 is embodied as a mobile network, and comprises a condition and charging node 202 embodied as a PCRF, a condition handling node 204 adapted as a PCEF and a charging node 106 embodied as an OCF. The PCEF 104 is co-located at a GGSN. The PCRF 202 thus acts as a Charging Trigger Function (CTF) for the OCF 106. An application server 208 of the mobile network 200 and a terminal 210 residing in the mobile network 200 have established a connection to one another, which is indicated by a first step 220 of the method. An application function (AF) of the application server 208 provides a service to the terminal 210 via the established connection, for example real-time gaming. Charging in the network 200 is based on immediate charging with a decentralized unit determination and centralized rating similarly to 3GPP TS 32.299 v11.3.0.

In a step 222, the terminal 210 sends a HTTP based tentative quality modification request for a desired modification of a quality of the provided service to the AF of the application server 208, in order to indicate to the AF that a user of the terminal 210 requires a new policy for the connection. This policy is associated with an improved Quality of Service (QoS) experience of the user. Next, in a step 224, the application server 208 sends a tentative modification request to the PCRF 202. The modification request comprises an indicator for a tentative charging event, and is configured as a CCR Command. The indicator is an Attribute Value Parameter (AVP) in the CCR Command, and is denoted in FIG. 2 as "Tentative_Event". Hence, the PCRF 202 is informed about a modification in the expectations of the user of the terminal 210 relating to the QoS of the on-going service provision. In a step 226, the network gateway 212 informs the PCRF 202 about a location of the terminal 210 in the mobile network 200 and subscriber information of a subscriber of the terminal 210 by sending respective information. The network 200 and the terminal 210 assume the user of the terminal 210 to be a subscriber of the AF and to be associated with the terminal 210. In a step 228, the PCRF 202 determines a first policy for the connection based on the CCR Command and the information received in the step 226. The determined first policy is different from the policy used so far for the established connection, and comprises modified QoS parameter used for a bearer associated with the connection. Further, the PCRF 202 determines, together with the first policy, a number of units in a virtual currency to be charged from the subscriber of the terminal 210. In a next step 230, the PCRF 202 sends a tentative determination request for a charging price associated with the determined first policy to the OCF 206. This request is also configured as a CCR Command indicating the tentative charging event by the AVP and the number of determined units by another AVP indicator. In a step 232, the network gateway 212 sends the subscriber information and the information about the location of the terminal 210 in the mobile network 200 to the OCF 206. In a step 234, the OCF 206 performs a rating control according to 3GPP TS 32.299 v11.3.0 using a rating function of the OCF 206 for determining the first charging price for the determined first policy. To this end, the OCF 206 calculates a first monetary amount in a real currency, for example Euro, in terms of a first number of monetary units as the first charging price based on the received first number of units and the information received in the step 232. Thereupon, in a step 236, the OCF 206 informs the PCRF 202 about the determined first charging price using a CCA Command comprising an AVP based indicator for the determined first monetary amount.

Next, in a step 238, the PCRF 202 sends the determined first policy and the determined first charging price to the AF of the application server 208 in that the PCRF 202 answers the CCR based request by sending a CCA Command comprising an AVP based indicator for the determined first policy and the AVP based indicator for the determined first monetary amount. In a step 240, the AF of the application server 208 converts the received information relating to the first policy into quality information to be understood by the terminal 210 and the user of the terminal 210. To this end, the AF parses the received AVP indicators of the first policy and the first charging price, and converts the AVP indicator for the determined first policy into, for example, a download data rate of a data transmission between the AF and the terminal 210 and an allocated bandwidth. The AVP indicator for the monetary amount is interpretable by the terminal 210. Thereupon, in a step 242, the application server 208 sends the quality information and the determined first monetary amount in the form of the AVP indicator to the terminal 210 using a HTTP type message. In a step 244, the user of the terminal 210 activates a software based button on a display of the terminal 210 for indicating an acceptance of the accordingly converted and presented quality information for the service provision and presented first the monetary amount. Thereupon, in a step 246, the terminal 210 sends a respective HTTP based acceptance indication to the AF of the application server 208 based on the user input.

In a step 248, the AF of the application server 208 informs the PCRF 202 about a definite modification in the expectations of the user of the terminal 210 regarding the QoS of the service provision by sending a modification request configured as the CCR Command and comprising an AVP based indicator for a charging event. Next, in a step 250, the network gateway 212 provides the subscriber information and the information of the location of the terminal 210 in the mobile network 200 to the PCRF 202. In a next step 252, the PCRF 202 determines a time value of a time interval between the steps 238 and 248 using a timer of the PCRF 102, and compares the determined time value with a threshold value preconfigured in the PCRF 202. The threshold value is, for example, one minute. Assuming the comparison to result in the time value being equal to or exceeding the threshold value, the PCRF 202 determines in a step 254 a second policy to be used for the connection between the AF of the application server 208 and the terminal 210. For example, the PCRF 202 determines that another different default bearer is to be established between the terminal 210 and the application server 208 and to be used for the service provision. Further, the PCRF 202 determines a second number of units in a virtual currency to be charged from the subscriber of the terminal 210. In a next step 256, the PCRF 202 sends a determination request for a second charging price to the OCF 206, in order to request the OCF 206 to calculate a second monetary amount in terms of a second number of monetary units in the real currency representing the second charging price based on the determined second number of units. To this end, the determination request is configured as a CCR Command comprising an AVP based indicator for a charging event and an AVP based indicator for the second number of units. Next, in a step 258, the PCRF 202 instructs the PCEF 204 to modify the currently used policy associated with the connection between the terminal 210 and the application server 208 by sending instruction information configured as a command message, for example a Re-Authorization Request (RAR) message via a Gx interface between the PCRF 202 and the PCEF 206. In a step, 260 the PCEF 204 enforces the second policy upon reception of the command message. Therefore, the service is then provided to the terminal 210 for example, at once, in fractions or in individually chargeable items, corresponding to the determined second charging price.

In a step 262, the network gateway 212 provides the subscriber information and the information about the location of the terminal 210 in the mobile network 200 to the OCF 206 for a subsequent determination of a second charging price associated with the determined second policy. In steps 264, 266, the OCF 206 determines the second charging price based on the determination request, and charges the subscriber of the terminal 210 for the second policy enforced between the terminal 210 and the application server 208 based on the first charging price by performing a rating control for the second charging price and account control for the first charging price, respectively. To this end, the OCF 206 assigns a second monetary amount to the second number of units received in the step 256 using the rating function. The second charging price is calculated for recording purposes by the network 200 but may not affect the subscriber of the terminal 210. The OCF 206 executes an account control for deducting a part of the first monetary amount determined in the step 234 from an account of the subscriber of the terminal 210. Further, as the subscriber of the terminal 210 participates in a loyalty program established in the network 200, the OCF 206 deducts a number of loyalty points equal to the remaining, i.e. not deducted, part of the first monetary amount from a loyalty point based account of the subscriber of the terminal 210. In a case in which the complete first monetary amount cannot be deducted from the subscriber account, the OCF 206 also informs the PCRF 202 about the non deductable part of the monetary amount. The PCRF 202 accordingly determines to limit the service provision according to the non deductable part of the monetary amount and accordingly informs the PCEF 204 either using the instruction information sent in the step 258 or using further instruction information. The PCEF 204 modifies the policy for the connection based on the second policy and this information.

The determined first and second policies may be identical to one another and/or the determined first and second charging prices may be identical to one another.

The time interval value may be also reported to the terminal 210 in the step 242 to indicate to a user of the terminal 210 that accepting a specific condition and charging price may be dependent on the time between the offer received in the step 242 and the accepting of the offer in the step 244. The user must be aware of a different condition and charging price, if the user may wait too long with the accepting in the step 244.

The step 260 of modifying a condition may be also executed based on the first policy determined in the step 228, and the subscriber of the terminal 210 may be charged for the first charging price. Accordingly, the steps 254, 156 264 may be executed for recording purposes by the network 200 without affecting the subscriber of the terminal 210.

If the comparison of the step 252 results in the time value of the time interval being less than the threshold value, the steps 254, 256, 264 may be omitted. Alternatively, the steps 254, 256 and 264 may be executed for recording purposes by the network 200. The step 260 may be executed based on the determined first policy or the second policy, if determined, and the step 266 may be executed based on the determined first charging price.

The steps 226, 232, 250, 262 may be executed at different times with respect to the message flow in FIG. 1. For example, the steps 226 and/or 232 may be also executed immediately during the connection setup of the connection between the terminal 210 and the application server 208. Further, the network gateway 212 may send in the step 226 the information to the charging node 206, which upon receipt of the information extracts the information and relays the information to the condition and charging node 202. Hence, the step 232 may be omitted. The latter may also apply for the sent messages in the steps 250, 262. Further, assuming the comparison step 252 to result in the time value being less than or equal to the threshold value, the steps 250, 262 may be omitted. The information may be sent in the steps 226, 232, 250, 258 upon receipt of a request by the network gateway 212 from the respective recipient of the sent information.

Further, the application server 208 may send the tentative modification request and/or the modification request to a further application server which may forward the tentative modification request and/or the modification request to the OCRF 202, respectively. Accordingly, the PCRF 202 may send the determined first policy and the first charging price to the further application server which may forward the latter information to the application server 208.

Figure 3:
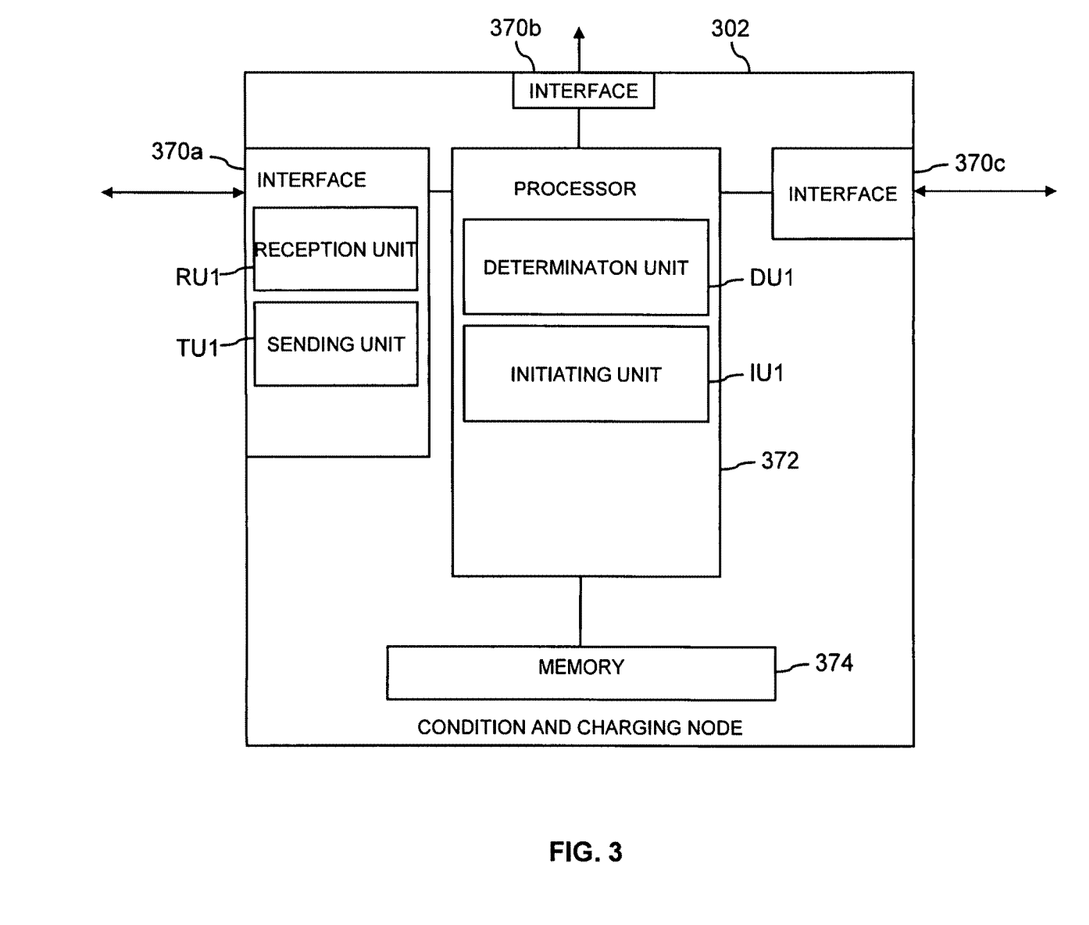
FIG. 3 is a block diagram illustrating a condition and charging node for modifying a quality of a connection between a terminal and an application server of a network according to an exemplary embodiment.

Referring to FIG. 3, a condition and charging node 302 for modifying a quality of a connection between a terminal and an application server of a network according to an exemplary embodiment will be explained. The application server provides a service to the terminal via the connection. The condition and charging node 302 is part of the network. The condition and charging node 302 comprises interfaces 370a-370c adapted to communicate in association with a method for modifying a quality of a connection between a terminal and an application server of a network as described above. The condition and charging node 302 further comprises a processor 372 adapted to process information associated with the method, and a memory 374 adapted to store information associated with the method. A determination unit DU1 of the processor 372 is adapted to determine a condition of the connection to be modified based on a quality modification request of the terminal for a desired modification of a quality of the provided service. The determined condition to be modified is associated with the quality of the provided service. An initiating unit IU1 of the processor 372 is adapted to initiate determining, by the network, a charging price for the determined condition of the connection to be modified. The initiating unit IU1 is adapted to initiate modifying, by the network, a condition of the connection, and is adapted to initiate charging, by the network, for modifying the condition of the connection. A reception unit RU1 of the interface 370a is adapted to receive information associated with the method, and a sending unit TU1 of the interface 370a is adapted to send information associated with the method.

In particular, the determination unit DU1 is adapted to determine a policy to be used for the connection between the terminal and the application server and to determine a number of units in a virtual currency to be charged from a subscriber of the terminal. The initiating unit IU1 may be adapted to send a tentative determination request or a determination request for a charging price to a charging node of the network.

The condition and charging node 302 is configured as a PCRF.

Figure 4:
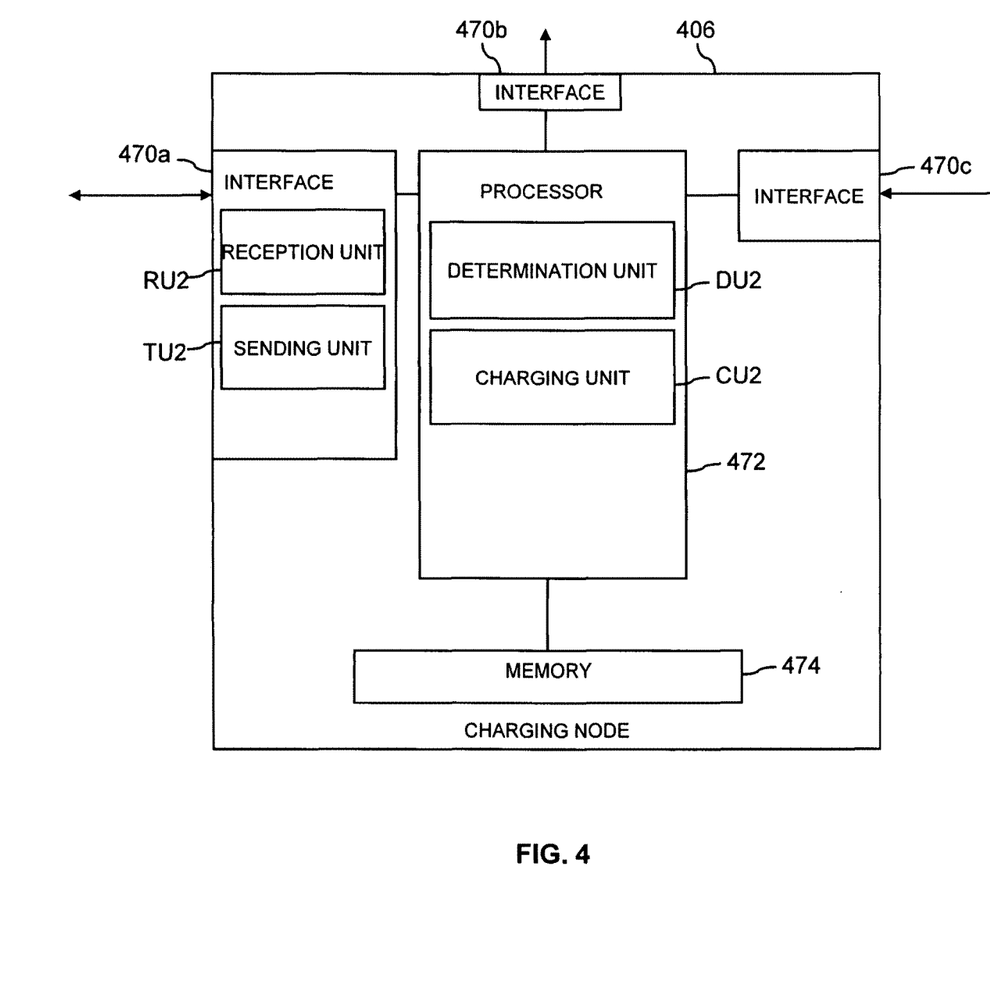
FIG. 4 is a block diagram illustrating a charging node for modifying a quality of a connection between a terminal and an application server of a network according to an exemplary embodiment.

Referring to FIG. 4, a charging node 406 for modifying a quality of a connection between a terminal and an application server of a network according to an exemplary embodiment will be explained. The application server provides a service to the terminal via the connection. The charging node 406 is part of the network. The charging node 406 comprises three interfaces 470a-470c adapted to communicate in association with a method for modifying a quality of a connection between a terminal and an application server of a network as described above. A processor 472 of the charging node 406 is adapted to process information associated with the method, and a memory 474 of the charging node 406 is adapted to store information associated with the method. A determination unit DU2 of the processor 472 is adapted to determine a charging price for a network determined condition of the connection to be modified based on a quality modification request of the terminal for a desired modification of a quality of the provided service. The determined condition to be modified is associated with the quality of the provided service. A charging unit CU2 of the processor 472 is adapted to charge, for example a subscriber of the terminal, for modifying a condition of the connection in association with modifying, by the network, the condition of the connection. A reception unit RU2 of the interface 470a is adapted to receive information associated with the method, and a sending unit TU2 of the interface 470a is adapted to send information associated with the method.

In particular, the determination unit DU2 may be adapted to determine a monetary amount in a real currency based on a number of units in a virtual currency received from a condition and charging node having determined the number of units in response to a received quality modification request. The charging unit CU2 may be adapted to charge for modifying a condition based on an output of the determination unit DU2.

The charging node 406 is embodied as an OCF.

Figure 5:
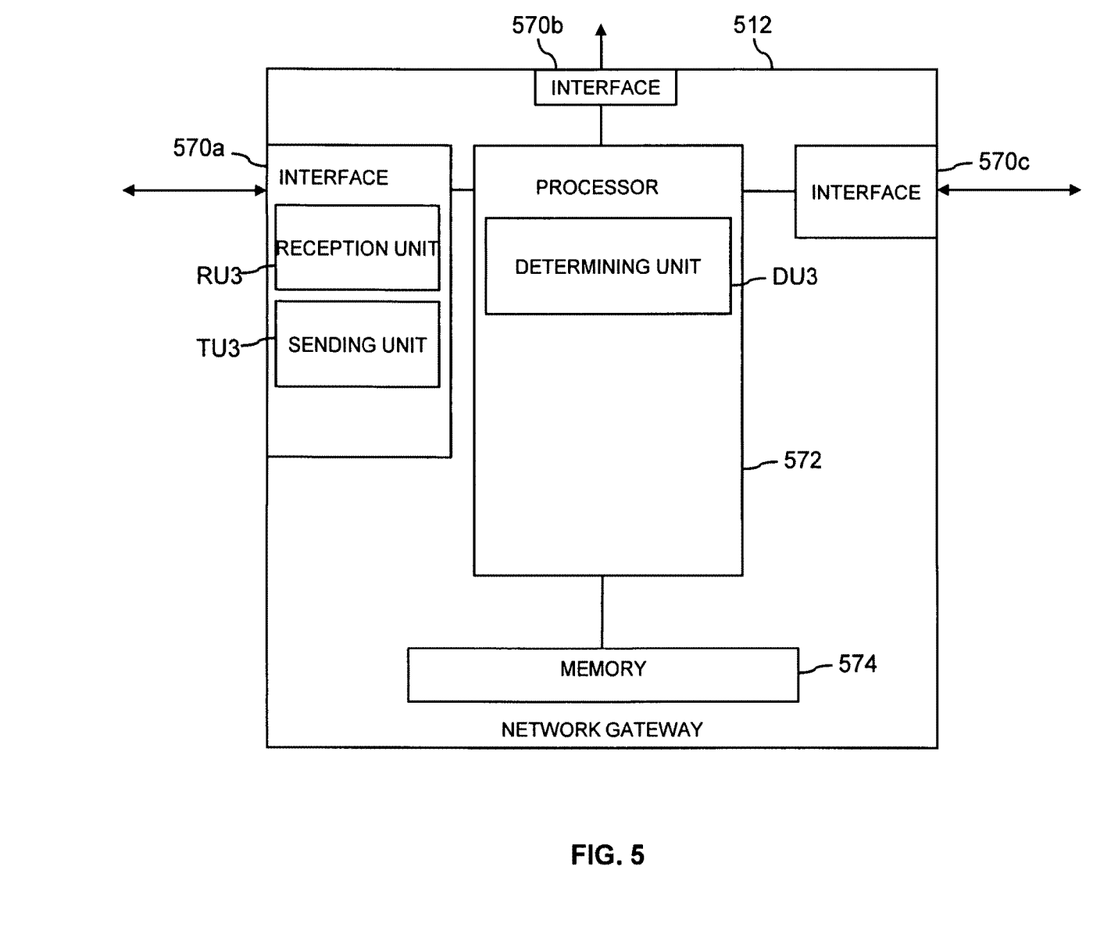
FIG. 5 is a network gateway for modifying a quality of a connection between a terminal and an application server of a network according to an exemplary embodiment.

Referring to FIG. 5, a network gateway 512 for modifying a quality of the connection between a terminal and an application server of a network according to an exemplary embodiment will be explained. The application server provides a service to the terminal via the connection. The network gateway 512 is part of the network. The network gateway 512 comprises three interfaces 570a-570c adapted to communicate in association with a method for modifying a quality of a connection between a terminal and an application server of a network as explained above. A processor 572 of the network gateway 512 is adapted to process information associated with the method, and a memory 574 of the network gateway 512 is adapted to store information associated with the method. A determination unit DU3 of the processor 572 is adapted to determine information to be sent for the network determining a condition of the connection to be modified based on a quality modification request of the terminal for a desired modification of a quality of the provided service, for the network determining a charging price for the determined condition of the connection to be modified, for the network modifying a condition of the connection and the network charging for modifying the condition of the connection. The determined condition to be modified is associated with the quality of the provided service. The information may be at least one of the group of subscriber information of the subscriber associated with the terminal, a location of the terminal, a day time, and a network resources utilization of the network. A reception unit RU3 of the interface 570a is adapted to receive information associated with the method, for example a request from a condition and charging node and/or a charging node for the information. A sending unit TU3 of the interface 570a is adapted to send information associated with the method, particularly the information determined and outputted by the determination unit DU3 of the processor 572.

The network gateway 512 is connected to the condition and charging node, for example a PCRF, via an Ud interface.

It is noted that an association between the physical units of the above described nodes, for example the interfaces, the processor and the memory, and the functionally defined units, for example the determination unit, the reception unit and the sending unit, may be different from the above described embodiments. For example, the sending unit TU1 of the interface 370a of the condition and charging node 302 is part of the interface 370a, the processor 372 and the memory 374.

While the invention has been illustrated and described in detail in the drawings and foregoing description, such illustration and description are to be considered illustrative or exemplary and not restrictive; the invention is not limited to the disclosed embodiments, and in particular not to those embodiments in accordance with the cited 3GPP TSs. Other variations to the disclosed embodiments can be understood and effected by those skilled in the art in practicing the claimed invention, from a study of the drawings, the disclosure, and the appended claims. In the claims, the word "comprising" does not exclude other elements or steps, and the use of indefinite articles "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method for modifying a quality of an established connection of an on-going session between a terminal and an application server of a network, the application server providing a service to the terminal during the on-going session via the established connection, the method comprising:
    sending, by the terminal to the application server via the established connection that provides the service from the application server to the terminal, a quality modification request for a desired modification of a quality of the provided service during the on-going session, wherein the application server is separate from a gateway of the network,
    determining, by the network, a condition of the established connection to be modified based on the quality modification request, the determined condition to be modified being associated with the quality of the provided service during the on-going session,
    determining, by the network, a charging price for the determined condition of the established connection to be modified,
    modifying, by the network, a condition of the established connection,
    charging, by the network, for modifying the condition of the established connection,
    sending, by the application server, a tentative modification request for a modification of a condition of the established connection based on the received quality modification request,
    wherein the tentative modification request comprises an indicator for a tentative charging event.

2. The method according to claim 1, the method further comprising:
    sending, by the application server, a modification request for a modification of the condition of the established connection based on a received acceptance indication;
    determining, by the network, a further condition to be modified based on the modification request; and
    determining, by the network, a further charging price associated with the condition to be modified based on the modification request, in response to expiration of a time interval after sending the determined condition and the determined charging price to the terminal,
    wherein the step of modifying a condition is executed based on the determined condition or the further condition and the step of charging for modifying the condition is executed based on the determined charging price.

3. The method according to claim 2, wherein the modification request comprises an indicator for a charging event.

4. The method according to claim 1, the method further comprising:
    receiving, by the application server, the determined condition and the determined charging price,
    converting, by the application server, the determined condition into quality information, and
    sending, by the application server, the quality information and the charging price to the terminal.

5. The method according to claim 1, the method further comprising:
    sending, by a condition and charging node of the network, a tentative determination request to a charging node of the network for tentatively determining the charging price, and
    receiving the determined charging price from the charging node.

6. The method according to claim 5, wherein the step of determining the charging price is executed by a charging node of the network together with omitting the step of charging for modifying the condition.

7. The method according to claim 5, wherein the tentative determination request comprises an indicator for a tentative charging event.

8. The method according to claim 1, wherein the step of modifying a condition is executed by a condition handling node of the network in response to receiving instruction information to modify a condition of the established connection from a condition and charging node of the network.

9. The method according to claim 1, wherein the step of modifying is executed based on the determined condition of the established connection to be modified.

10. The method according to claim 1, wherein at least one of the step of determining, by the network, a condition of the established connection to be modified and the step of determining a charging price for the condition to be modified are based on at least one information of the group of subscriber information of a subscriber associated with the terminal, a location of the terminal, a day time, and a network resources utilization of the network.

11. A computer program product comprising a non-transitory computer readable medium storing program code which, when being executed by a processor, is adapted to carry out or control a method for modifying a quality of a connection between a terminal and an application server of the network according to claim 1.

12. The method of claim 1, wherein modifying comprises modifying a frequency spectrum for the established connection between the terminal and the application server.

13. A method for modifying a quality of an established connection of an on-going session between a terminal and an application server of a network, the application server providing a service to the terminal during the on-going session via the established connection, the method being executed by a condition and charging node of the network, the method comprising:
    receiving a modification request from the application server before determining a condition of the established connection to be modified,
    determining the condition of the established connection to be modified, the determined condition to be modified being associated with a quality of the provided service during the on-going session,
    initiating to determine, by the network, a charging price for the determined condition of the established connection to be modified,
    initiating to modify, by the network, a condition of the established connection,
    initiating to charge, by the network, for modifying the condition of the established connection,
    wherein the modification request comprises a tentative modification request for a modification of a condition of the established connection based on a quality modification request received by the application server from the terminal, and
    wherein the tentative modification request comprises an indicator for a tentative charging event.

14. The method of claim 13,
    wherein the provided service comprises a social media or video conference service,
    wherein receiving the modification request comprises receiving a request from the application server for a non-binding offer of modified service, and wherein the method further comprises transmitting the non-binding offer of modified service to the application server.

15. A method for modifying a quality of an established connection of an on-going session between a terminal and an application server of a network, the application server providing a service to the terminal during the on-going session via the established connection, the method being executed by a charging node of the network, the method comprising:
receiving a price request that is based on a quality modification request of the terminal for a desired modification of a quality of the provided service during the on-going session,
determining a charging price for a network determined condition of the established connection to be modified, in response to receiving the price request,
sending the determined condition and the determined charging price to the terminal,
receiving, from the terminal, an acceptance indication indicating an acceptance of the determined condition and the determined charging price,
responsive to receiving the acceptance indication, charging for modifying a condition of the connection in association with modifying, by the network, the condition of the established connection,
wherein the provided service comprises a social media or video conference service that is provided during the on-going session from the application server to the terminal via the established connection, and
wherein the quality modification request is configured as a tentative quality modification request for a desired modification of the quality of the provided service during the on-going session.

16. A condition and charging node for modifying a quality of an established connection of an on-going session between a terminal and an application server of a network, the application server providing a service to the terminal during the on-going session via the established connection, the condition and charging node being part of the network, the condition and charging node comprising:
an interface adapted to receive a modification request from the application server before the condition and charging node determines a condition of the established connection to be modified, and
a processor coupled to the interface and adapted to:
determine the condition of the established connection to be modified, the determined condition to be modified being associated with a quality of the provided service during the on-going session,
initiate determining, by the network, a charging price for the determined condition of the established connection to be modified,
initiate modifying, by the network, a condition of the established connection, and
initiate charging, by the network, for modifying the condition of the established connection,
wherein the modification request comprises a tentative modification request for a modification of a condition of the established connection based on a quality modification request received by the application server from the terminal, and
wherein the tentative modification request comprises an indicator for a tentative charging event.

17. A charging node for modifying a quality of an established connection of an on-going session between a terminal and an application server of a network, the application server providing a service to the terminal during the on-going session via the established connection, the charging node being part of the network, the charging node comprising:
at least one interface adapted to receive:
information, from a gateway, regarding a location of the terminal; and
a price request that is based on a quality modification request of the terminal for a desired modification of a quality of the provided service during the on-going session,
a processor coupled to the at least one interface and adapted to:
determine, in response to receiving the price request, a charging price for a network determined condition of the established connection to be modified, the determined condition to be modified being associated with a quality of the provided service during the on-going session, and
charge for modifying a condition of the established connection in association with modifying, by the network, the condition of the established connection,
wherein the at least one interface is further adapted to:
send the determined condition and the determined charging price to the terminal,
receive, from the terminal, an acceptance indication indicating an acceptance of the determined condition and the determined charging price, and
wherein the processor is further adapted to charge for modifying the condition of the established connected responsive to receiving the acceptance indication.

* * * * *